United States Patent
Moghaddam et al.

(10) Patent No.: US 10,151,498 B2
(45) Date of Patent: Dec. 11, 2018

(54) OPEN ABSORPTION CYCLE FOR COMBINED DEHUMIDIFICATION, WATER HEATING, AND EVAPORATIVE COOLING

(71) Applicants: University of Florida Research Foundation, Incorporated, Gainesville, FL (US); UT-Battelle, LLC, Oak Ridge, TN (US)

(72) Inventors: Saeed Moghaddam, Gainesville, FL (US); Devesh Chugh, Gainesville, FL (US); Rasool Nasrisfahani, Gainesville, FL (US); Sajjad Bigham, Gainesville, FL (US); Seyyed A. Fazeli, Gainesville, FL (US); Dazhi Yu, Gainesville, FL (US); Mehdi Mortazavi, Gainesville, FL (US); Omar Abdelaziz, Bethesda, MD (US)

(73) Assignees: University of Florida Research Foundation, Incorporated, Gainesville, FL (US); UT-Battelle, LLC, Oak Ridge, TN (US)

( * ) Notice: Subject to any disclaimer, the term of this patent is extended or adjusted under 35 U.S.C. 154(b) by 52 days.

(21) Appl. No.: 15/206,920

(22) Filed: Jul. 11, 2016

(65) Prior Publication Data
US 2016/0320079 A1 Nov. 3, 2016

Related U.S. Application Data

(63) Continuation-in-part of application No. PCT/US2015/010757, filed on Jan. 9, 2015.
(Continued)

(51) Int. Cl.
*F24H 4/00* (2006.01)
*F24F 5/00* (2006.01)
(Continued)

(52) U.S. Cl.
CPC .......... *F24F 5/0014* (2013.01); *F24F 3/1417* (2013.01); *F24F 5/0035* (2013.01);
(Continued)

(58) Field of Classification Search
CPC ......... F24F 5/0014; F24F 3/1411; F24H 4/00; F25B 15/06; F25B 31/00; F25B 35/02; Y02B 30/12; Y02B 30/62
See application file for complete search history.

(56) References Cited

U.S. PATENT DOCUMENTS 4,672,821 A * 6/1987 Furutera ................. F25B 15/06
                                                                           62/238.3
5,655,373 A * 8/1997 Yamashita ............... F02C 7/143
                                                                             60/728
(Continued)

FOREIGN PATENT DOCUMENTS

WO     WO 2013/063210       5/2013
WO     WO 2013063210 A1 * 5/2013 ............ F25B 15/00

OTHER PUBLICATIONS

Annett Kuhn, Thermally driven heat pumps for heating and cooling, Oct. 2013, p. 10.*

(Continued)

*Primary Examiner* — Frantz Jules
*Assistant Examiner* — Lionel Nouketcha
(74) *Attorney, Agent, or Firm* — Alston & Bird LLP

(57) ABSTRACT

An absorption cycle system, which permits water heating, dehumidifying, and/or evaporative cooling, includes a desorber, absorber, heat exchanger, and, optionally, an evaporator, is constructed to heat a process water that is plumbed through the absorber, heat exchanger, and condenser. In the absence or isolation of the evaporator, the system can dehumidify ambient air to the absorber. The water vapor released by evaporative cooling at the evaporator can be (Continued)

provided to the absorber in a controlled manner to simultaneously maintain a desired humidity while cooling the air ambient by the evaporator. The absorption cycle system can be housed within a single unit or can be compartmentalized.

14 Claims, 5 Drawing Sheets

Related U.S. Application Data

(60) Provisional application No. 61/925,435, filed on Jan. 9, 2014.

(51) Int. Cl.
| | |
|---|---|
| *F25B 15/06* | (2006.01) |
| *F25B 25/00* | (2006.01) |
| *F25B 31/00* | (2006.01) |
| *F25B 35/02* | (2006.01) |
| *F24F 3/14* | (2006.01) |
| *F24F 13/22* | (2006.01) |

(52) U.S. Cl.
CPC ............... *F24H 4/00* (2013.01); *F25B 15/06* (2013.01); *F25B 25/005* (2013.01); *F24F 3/1411* (2013.01); *F24F 2003/1435* (2013.01); *F24F 2013/225* (2013.01); *F24F 2221/54* (2013.01); *F25B 31/00* (2013.01); *F25B 35/02* (2013.01); *Y02A 30/277* (2018.01); *Y02B 30/12* (2013.01); *Y02B 30/62* (2013.01)

(56) References Cited

U.S. PATENT DOCUMENTS

| | | | |
|---|---|---|---|
| 6,018,954 A | 2/2000 | Assaf | |
| 6,134,903 A * | 10/2000 | Potnis | B01D 53/263 |
| | | | 165/154 |
| 8,739,560 B2 * | 6/2014 | Wang | F25B 15/02 |
| | | | 62/101 |
| 2003/0041608 A1 * | 3/2003 | Gonzalez-Cruz | F25B 27/007 |
| | | | 62/235.1 |
| 2010/0281899 A1 | 11/2010 | Garrabrant | |
| 2012/0000221 A1 | 1/2012 | Abdelaziz et al. | |

OTHER PUBLICATIONS

Chugh, D. et al., "A Novel Absorption Cycle for Combined Water Heating, Dehumidification, and Evaporative Cooling," *International Sorption Heat Pump Conference*, Mar. 31-Apr. 3, 2014, Washington, D.C., pp. 1-10.

Das, R.S. et al., "Experimental performance of indirect air-liquid membrane contactors for liquid desiccant cooling systems," *Energy*, 2013, pp. 319-325, vol. 57.

Kim, D.S. et al., "A GIBBS Energy Equation for LiBr/$H_2O$ Solutions," *Engineering Thermodynamics*, Mechanical Engineering, TU Delft, Mekelweg 2, 2628 CD Deltf, the Netherlands, pp. 1-9.

Isfahani, R.N. et al., "Absorption characteristics of lithium bromide (LiBr) solution constrained by superhydrophobic nanofibrous structures," *International Journal of Heat and Mass Transfer*, 2013, pp. 82-90, vol. 63.

Isfahani, R.N. et al., "Physics of lithium bromide (LiBr) solution dewatering through vapor venting membranes," *International Journal of Multiphase Flow*, 2014, pp. 27-38, vol. 58.

Palacios-Bereche, R. et al., "Exergy calculation of lithium bromide-water solution and its application in the exergetic evaluation of absorption refrigeration systems LiBr—$H_2O$," *International Journal of Energy Research*, 2010, pp. 1-16.

Sencan, A. et al., Exergy analysis of lithium bromide/water absorption systems, *Renewable Energy*, 2005, pp. 645-657, vol. 30.

International Searching Authority, International Search Report and Written Opinion for International Application No. PCT/US15/10757, dated Apr. 3, 2015, 8 pages, United States Patent and Trademark Office, US.

* cited by examiner

OPEN ABSORPTION CYCLE FOR COMBINED DEHUMIDIFICATION, WATER HEATING, AND EVAPORATIVE COOLING

CROSS-REFERENCE TO RELATED APPLICATIONS

This application is a continuation-in-part of International patent application number PCT/US2015/010757, filed Jan. 9, 2015, which claims the benefit of U.S. Provisional Application Ser. No. 61/925,435, filed Jan. 9, 2014, the disclosures of which are hereby incorporated by reference in their entireties, including all figures, tables and drawings.

This invention was made with government support under DE-AC08-00OR22725 awarded by the Department of Energy. The government has certain rights in the invention.

BACKGROUND OF INVENTION

Vapor compression systems (VCSs) have helped shape modern civilization and population demographics. Increased access to electricity in the later part of the 19th century and better performance and operational characteristics of VCSs triggered the gradual replacement of absorption refrigeration systems, ARSs the cooling system of that time, with VCSs. Despite their great benefits, VCSs consume significant electrical energy and use refrigerants that are not environment friendly. As much as 72% of the U.S. electricity consumption is to buildings where a large proportion is used for space cooling/heating, dehumidification, and hot water heating. The use of these amenities is rapidly rising in developing countries. Refrigerant emission from VCSs in developing countries is also increasing. The development of more energy efficient technologies can greatly benefit the world's energy and environmental sustainability while sustaining or improving the quality of life. ARSs can use low-grade thermal energy, such as waste heat and solar-thermal energy, for cooling and heating; which can allow development of high performance, inexpensive, and robust systems.

In attempts to build compact and inexpensive systems, alternative heat exchanger configurations and system architectures have been examined. Depending on the choice of working fluid pairs, absorption systems are classified as ammonia-water or lithium bromide-water systems. LiBr-water systems use water as the refrigerant and LiBr solution as the absorbent. The size of heat exchangers required for absorption and desorption of water must account for the limited water mass transfer coefficient of LiBr solution. By enhancing the absorption and desorption transport processes, compact heat exchanger architectures can be developed for economical small-scale heating and cooling systems.

The absorbers and desorbers commonly employed in LiBr-water ARSs involve a falling film over horizontal or vertical tubes or are in a pool boiling configuration where water is boiled from a pool of LiBr solution. Falling-film desorbers are more suitable with low temperature heat sources. In a falling film desorber, LiBr solution is sprayed over a tube bundle to generate thin solution films over the tubes to facilitate a higher rate of water desorption while the heating medium flows within the tubes. At low surface temperatures, water directly diffuses out of the solution film until the solution temperature is insufficient to sustain a sufficient water vapor pressure above the solution.

To enhance the efficiency of these absorbers and desorbers, thin film systems have been investigated recently. Although the earlier work indicated that the absorption rates were only about half of that achievable with the conventional absorbers, the development of ultra-thin film absorbers, Moghaddam et al., WO2013/063210; Isfahani et al., *International Journal of Heat and Mass Transfer*, 2013, 63, 82-90; and Isfahani et al., *International Journal of Multiphase Flow*, 2014, 58, 27-38, identifies an absorber structure using a nanofiber membrane where the absorption rate is improved to beyond that possible from conventional absorbers. In like manner, an ultra-thin film absorber can function as an ultra-thin film desorber when the cooling source employed in the absorber is replaced with a heating source to drive desorption. Hence, a system employing ultra-thin film absorbers and desorbers for systems that can provide improved water heating, dehumidification and/or evaporative cooling is desirable.

BRIEF SUMMARY

Embodiments of the invention exploit an absorption technology to capture low grade heat to provide useful dehumidification and water heating. The technology involves a lithium bromide-water based absorption cycle where water cycles between absorption and desorption form a lithium bromide aqueous solution. Water vapor condenses and evaporates to complete the cycle. Ambient water vapor absorbs into a lithium bromide solution, which dehumidifies the ambient air. The energy released by the absorption of the ambient water vapor in the absorber due to the phase transition is used to heat the process fluid. The lithium bromide solution is regenerated in the desorber by providing sufficient heat to the solution. The desorbed water vapor is then condensed in the condenser where the condensation of water vapor in the condenser heats the process fluid, which is process water in embodiments of the invention. The condensed water vapor is either drained from the system to provide exclusively dehumidification at the absorber or is sprayed into an air stream to provide evaporative cooling of the air stream and the volume that the air stream services. Thus dehumidification, water heating, and evaporative cooling can be achieved by a single system.

DETAILED DISCLOSURE

Figure 1:
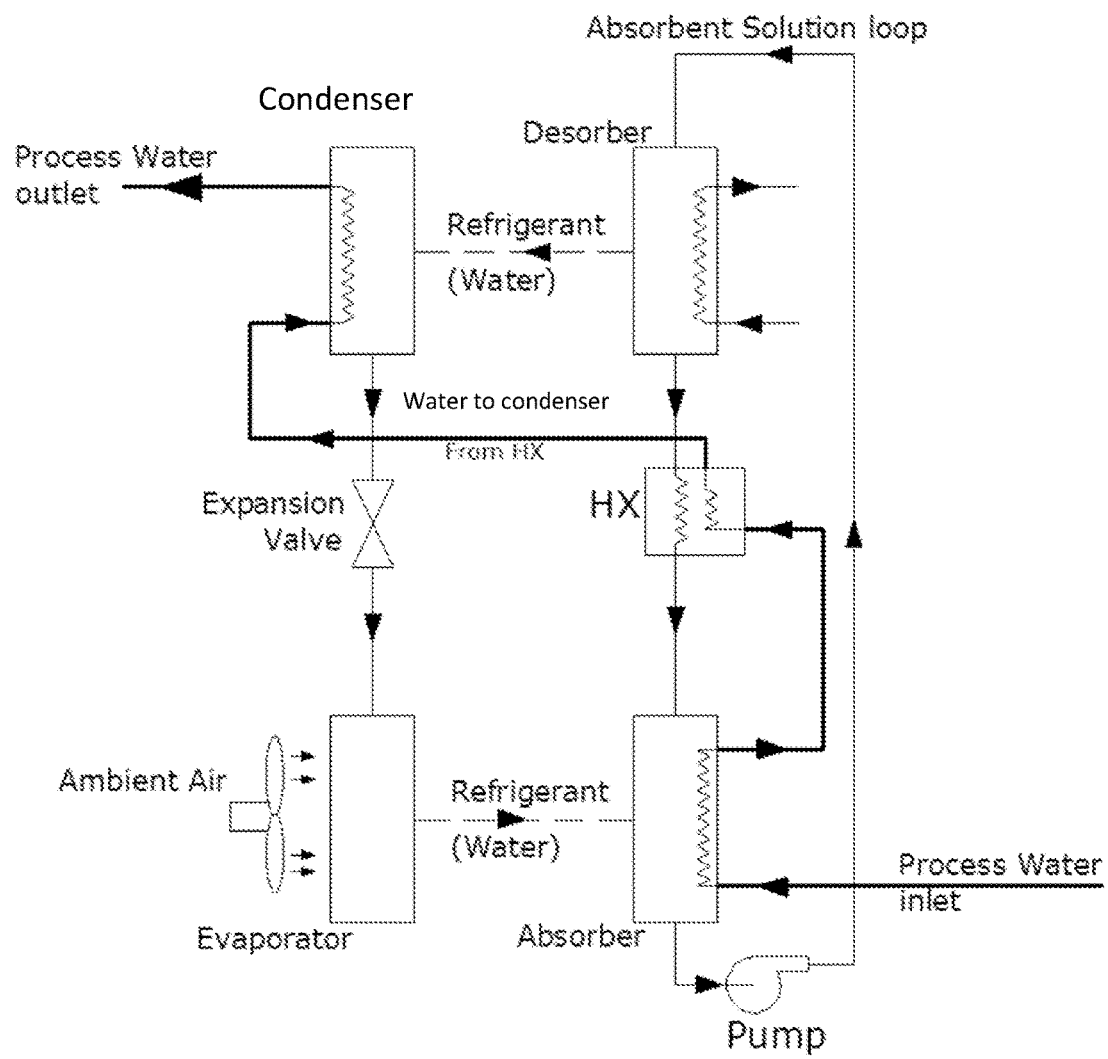
FIG. 1 shows an absorption cycle system for water heating, according to an embodiment of the invention.
Figure 2:
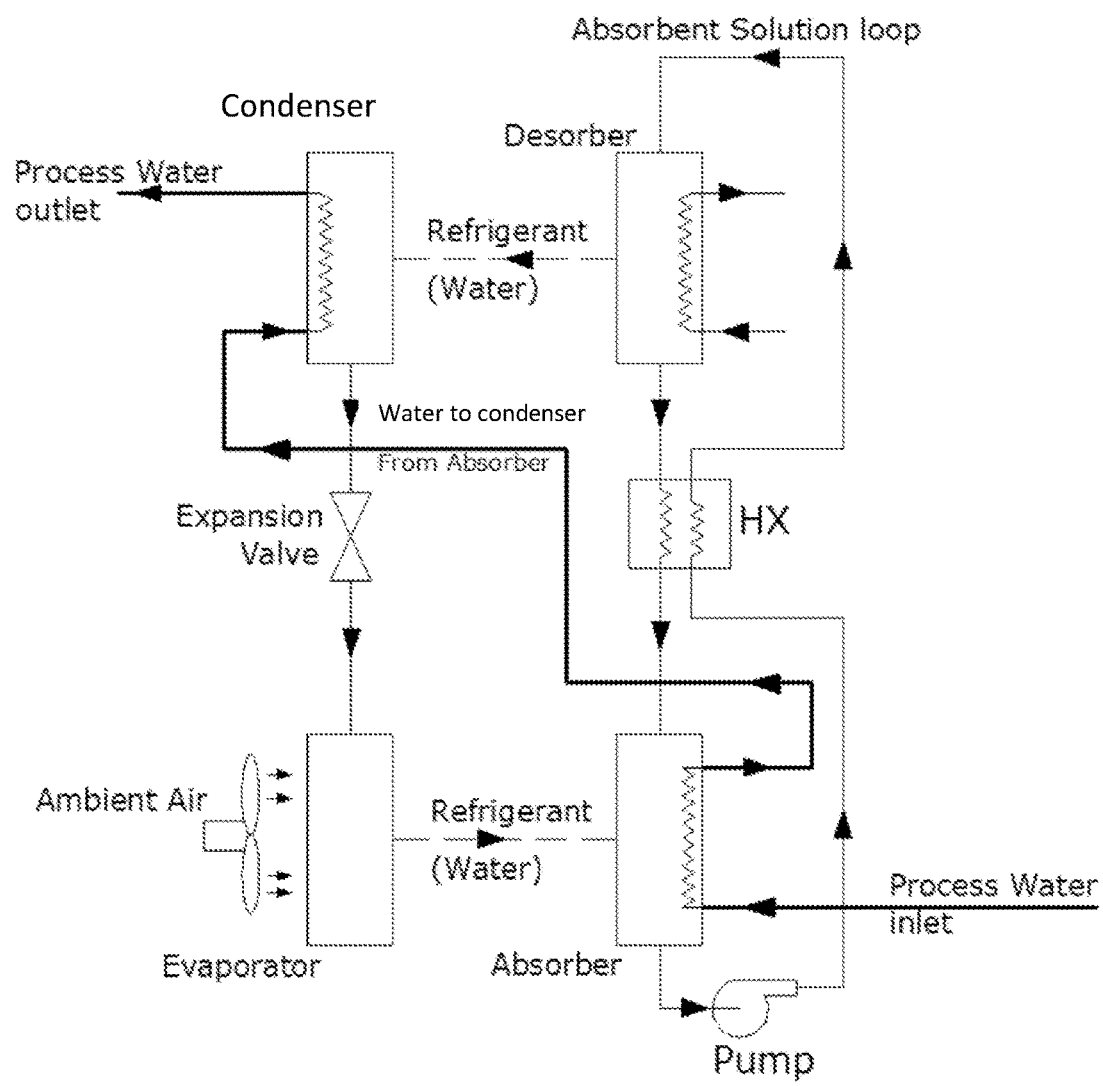
FIG. 2 shows a prior art heat pump based water heater.

Embodiments of the invention are directed to an open absorption cycle system where water heating, dehumidification, and/or evaporative cooling can be implemented through a single machine. Ultra-thin film absorbers and desorbers are employed where the membrane of the absorber permits a concentrated solution of a hygroscopic solute, for example, but not limited to a concentrated salt solution, for example, but not limited to, a concentrated LiBr solution, to interface with the ambient air and absorb the water vapor for dehumidifying. The latent heat of absorption that is released with the generation of a dilute solution of the hygroscopic solute, for example, but not limited to a dilute salt solution, for example but not limited to, a dilute LiBr solution, can be transferred into a process water stream used to cool the absorber. The concentrated solution regenerates by the loss of water vapor from the desorber, where it is heated by a heating fluid or other heating source. The water vapor generated in the desorber can be condensed, releasing its heat of condensation to the process water, which is employed as the coolant in the condenser. The condensed water vapor can be used for evaporative cooling in the presence of the absorber, or the condensed water vapor can simply be drained if evaporative cooling is not needed or desired, allowing the dehumidification of air in the vicinity of the absorber. In this manner, the open absorption cycle collects heat from the ambient and transfers that heat to the process water as a source of hot water, for use in a house or other building that requires hot water. To efficiently carry out these tasks of water heating, dehumidification, and/or cooling, an improved architecture for the water heating cycle that is employed in the system is illustrated in FIG. 1 for a water heating unit, according to an embodiment of the invention. This architecture recovers heat from the concentrated LiBr solution exiting the desorber at a heat exchanger using the process water. This feature of the architecture differs from a state of the art absorption heat pump based water heater, shown in FIG. 2, which uses the dilute LiBr solution exiting the absorber to absorb the heat placed into the concentrated LiBr solution at the desorber by means of the heat exchanger. A 3.2 kW conventional absorption heat pump water heater of five components, as shown in FIG. 2, was modeled using ABSIM software, which was developed at Oak Ridge National Laboratories, to probe the sensitivity of the coefficient of performance (COP) to changes in parameters employed. The results of this modeling are given in Table 1, below, which indicates that the effectiveness of the heat exchanger does not impact the COP of the system significantly. The insensitivity to the efficiency of the heat exchanger allows the design change of using the heat exchanger to warm process water rather than using dilute LiBr solution in an embodiment of the invention. The improved water heater increases the total amount of heat absorbed in the process water while relatively insignificantly increasing the amount of heat that must be provided from outside of the system at the desorber, however, the heat for the desorber can be augmented by an additional source of heating. Hence, the efficiency of producing hot water is significantly increased.

TABLE 1

Effect of parameter variation on the COP sensitivity, where the range of the parameter and the COP sensitivity to its change is relative to a base case COP

| Parameter | Range | Base value | Maximum Relative % COP change in COP |
| --- | --- | --- | --- |
| UA-Absorber (kW/K) | 0.05-0.8 | 0.3 | 1.6 |
| UA-Condenser (kW/K) | 0.05-0.6 | 0.25 | 4.3 |
| UA-Desorber (kW/K) | 0.002-0.2 | 0.03 | 16 |
| UA-Evaporator (kW/K) | 0.05-1.5 | 0.8 | 6.1 |
| Eff-Solution heat exchanger | 0.1-0.9 | 0.5 | 0.14 |
| Process water flow rate (kg/sec) | 0.005-0.1 | 0.02 | 22 |

TABLE 1-continued

Effect of parameter variation on the COP sensitivity, where the range of the parameter and the COP sensitivity to its change is relative to a base case COP

| Parameter | Range | Base value | Maximum Relative % COP change in COP |
| --- | --- | --- | --- |
| Flow rate of hot air(kg/sec) | 0.02-0.2 | 0.12 | 9.1 |
| LiBr Solution flow rate (kg/sec) | 0.0026-0.029 | 0.015 | 26 |

As an alternative to that shown in FIG. 1, the process water need not proceed in sequence as a cooling medium for the absorber, subsequently as a cooling medium for the heat exchanger, and subsequently as a cooling medium to the condenser, but can be plumbed in an alternative sequence or the process water flow can be plumbed to individually address one or more of the absorber, heat exchanger, and/or condenser. As an alternative to that shown in FIG. 1, the heat exchanger can have process water and dilute LiBr solution plumbed through the heat exchanger, where both fluids absorb heat from the hot concentrated LiBr solution.

As can be seen in FIG. 1, a pump directly transfers the dilute LiBr solution from the low temperature outlet of the absorber to the low temperature dilute LiBr solution inlet of the desorber. Although not shown in FIG. 1, in an embodiment of the invention, the dilute LiBr solution can be plumbed to act as a coolant of the pump such that at least a portion of the heat generated mechanically within the pump and/or pump motor can be transferred into the dilute LiBr solution to reduce the amount of heat that is required from a source external to the water heating system. The pump can be of any design that can resist corrosion by a dilute LiBr solution or other salt solution, including, but not limited to: rotary lobe pump, progressive cavity pump, rotary gear pump, piston pump, diaphragm pump, screw pump, gear pump, hydraulic pump, rotary vane pump, and flexible impeller pumps. The dilute LiBr solution exits the pump and bypasses a heat exchanger, which is used in conventional absorption heat pump based water heaters, as shown in FIG. 2. Alternatively, the process water that exits either the absorber, heat exchanger, or the condenser, can be plumbed to absorb heat from the pump. In similar fashion, the fan or other device to promote an air flow to the evaporator and/or absorber, as shown in FIG. 1, or a motor driving the device, can be plumbed to permit absorption of the heat from the fan motor into the process water or dilute LiBr solution.

Figure 3:
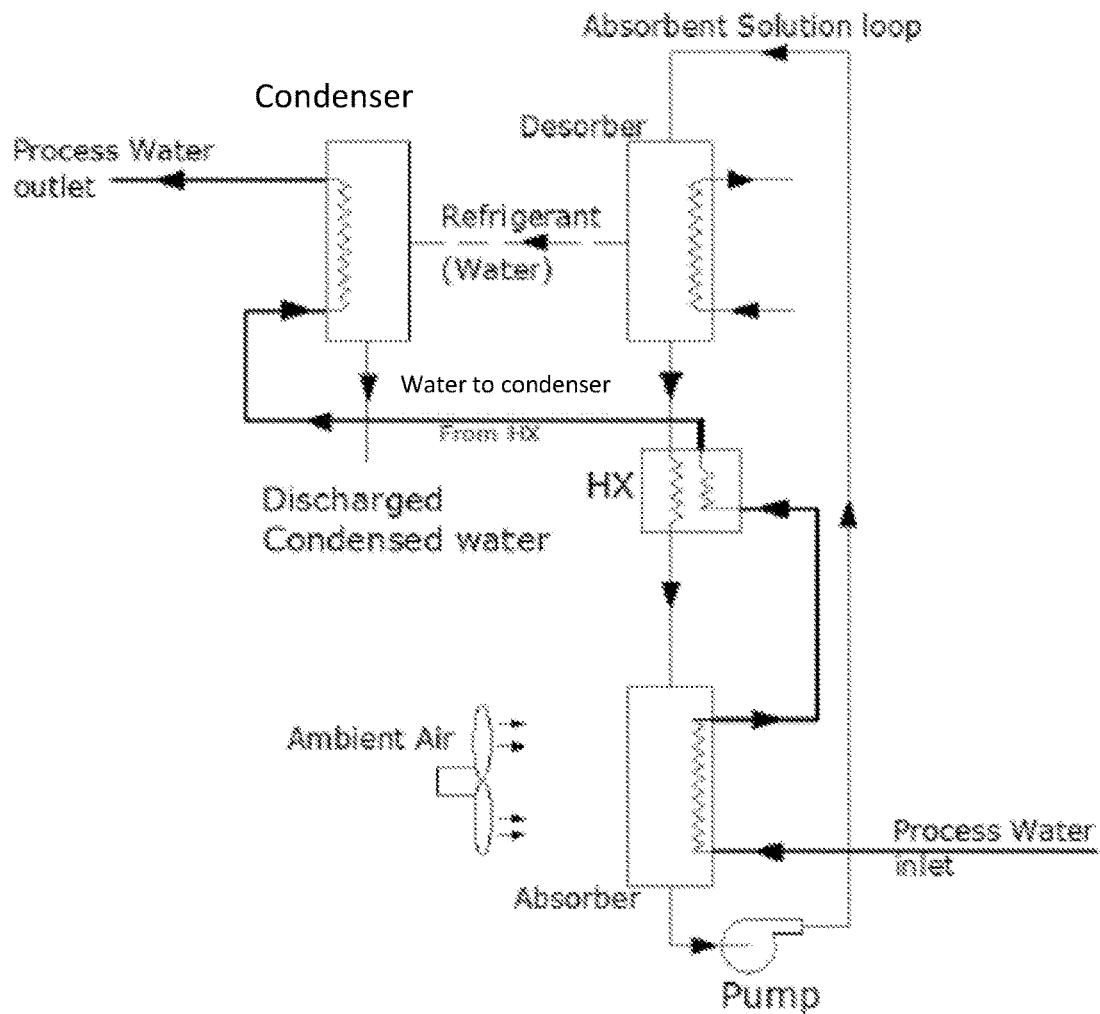
FIG. 3 shows an absorption cycle system for water heating and dehumidifying, according to an embodiment of the invention.

The absorber in the system, according to an embodiment of the invention, can be used to absorb moisture from ambient air. In embodiments of the invention, the absorber is an ultra-thin film absorber, as taught in Moghaddam et al., WO2013/063210, and incorporated herein by reference. Unlike liquid desiccant commercial dehumidifiers, which use a saturated aqueous solution and has direct contact of air and the saturated solution, the concentrated LiBr solution at the absorber is separated from air by the membrane. This separation allows for higher air velocities than that tolerated by direct contact systems, where desiccant can be forced from the functional site of the absorber. A schematic of a system where water heating and dehumidification, without evaporative cooling, is shown in FIG. 3. In this system, no evaporator is used and the water from the condenser is discarded rather than being returned to the absorber as water vapor.

Figure 4:
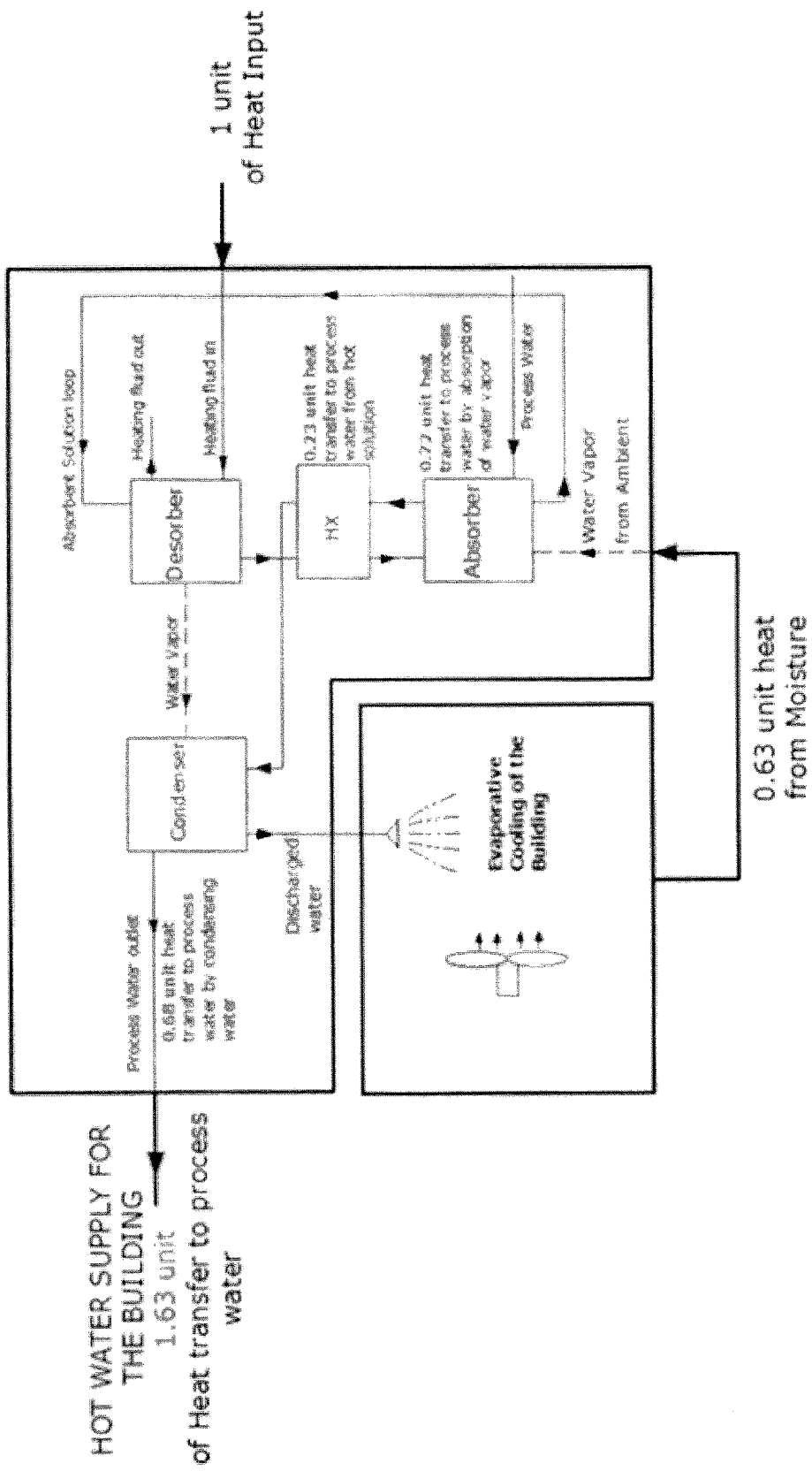
FIG. 4 shows an absorption cycle system for water heating, dehumidifying to a controlled humidity, and evaporative cooling, according to an embodiment of the invention.

In an embodiment of the invention, the system architecture allows water heating, dehumidification, and evaporative cooling, as shown in FIG. 4. In this embodiment of the invention, the evaporator is isolated from the absorber in a manner where an evaporator provides evaporative cooling where the water removed by the condenser is either discarded or provided to the evaporator, where the water vapor therefrom can be placed in communication with the absorber in a controlled fashion, for example, via a control valve, where a humidity in the presence of the absorber can be maintained at a low level, yet is sufficient humidity to drive the absorber-desorber cycle that heats the water.

Using ABSIM, an analysis of performance of the system under various conditions was calculated. The first two conditions require dehumidification and water heating, whereas the third requires that a sufficient amount of water vapor is introduced to the absorber to maintain a proper humidity to have the refrigerant water cycle between the open cycle absorber, desorber, condenser and evaporator. Table 2 gives the calculated COP normalized to the heat input to the desorber. As indicated in FIG. 4, the thermal COP is 1.63 for the system carrying out water heating, cooling, and maintaining a desired 50% relative humidity.

TABLE 2

Performance of the machine in different ambient conditions

| | Ambient | | Water | | |
|---|---|---|---|---|---|
| Environment | Temperature ° C. | RH % | Heat Input (kW) | Heating Capacity (kW) | Thermal COP |
| Cold humid basement | 6 | 80 | 2.12 | 3.28 | 1.54 |
| Humid Open Space | 35 | 70 | 2.2 | 3.78 | 1.72 |
| Air-conditioned closed space | 23 | 50 | 1.96 | 3.22 | 1.63 |

Hence, by the use of the absorption cycle system design, according to an embodiment of the invention, where the heat exchanger coolant differs from a conventional heat pump based water heater such that the cooling of the hot concentrated LiBr solution from the desorber is carried out by the process water rather than the dilute LiBr solution from the absorber, the efficiency of the system can be improved significantly. For example, an exemplary system, according to an embodiment of the invention, that has a 3.2 kW water heating capacity can achieve a thermal coefficient of performance (COP) of 1.6 for water heating while simultaneously performing dehumidification and cooling for a structure.

Figure 5:
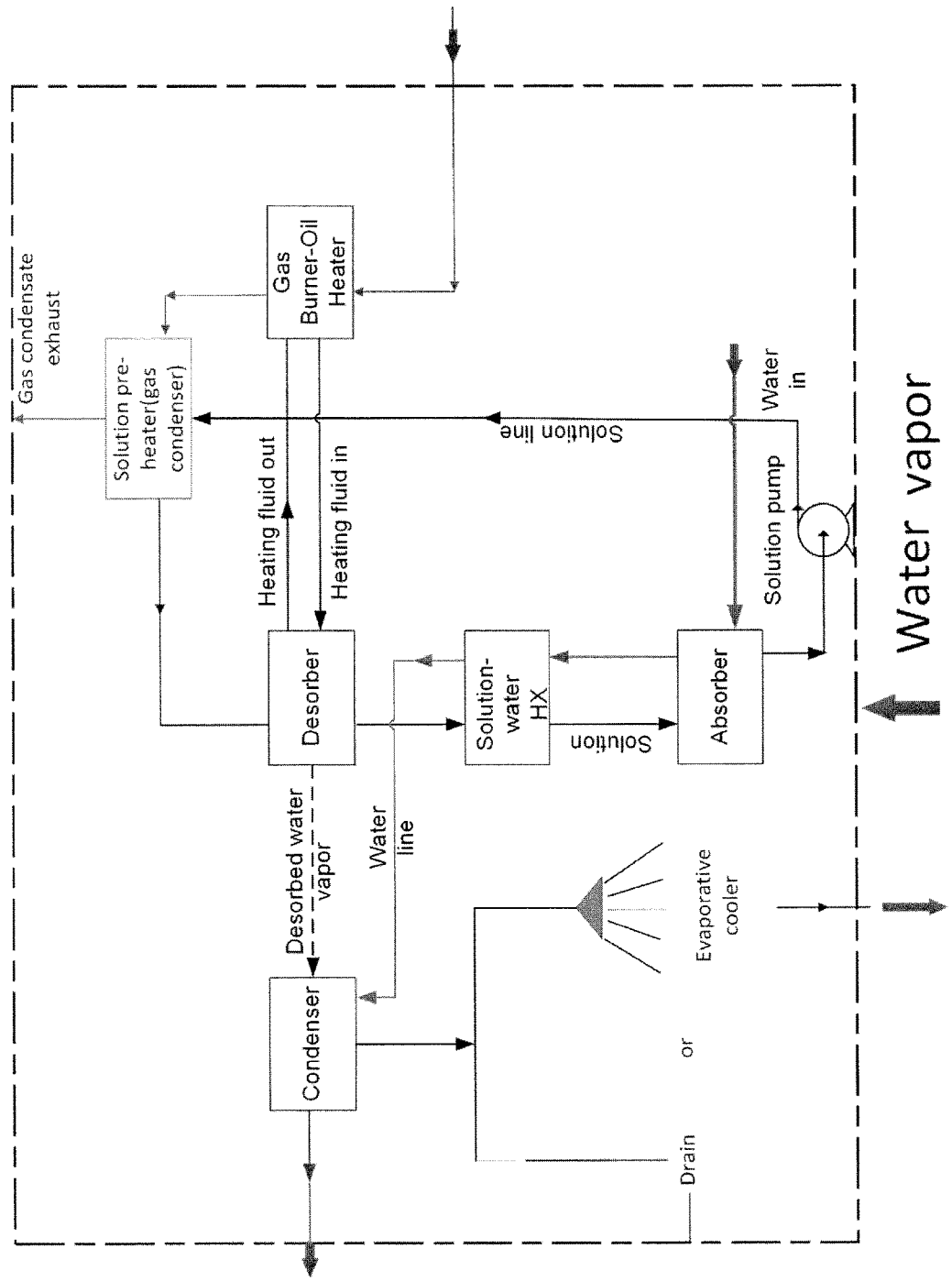
FIG. 5 shows an absorption cycle system for water heating, dehumidifying to a controlled humidity, and evaporative cooling where a second heat exchanger is employed for heating the desorber, according to an embodiment of the invention.

As shown in FIG. 5, the desorption process is augmented by a employing a second heat exchanger as a preheater of the dilute LiBr solution from the absorber. When the heat source for the desorber is a gas burner or oil heater, the water vapor formed upon combustion of the hydrocarbon or vapor from boiled water from a water source put through the gas burner, oil heater, or other source of heat, such as an electric heater, can be condensed in the second heat exchanger. The input for the burner or heater in FIG. 5 can be natural gas, oil, or a water flow that is heated by the burner or heater. The solution pre-heater transfers heat to the dilute LiBr solution before it is introduced to the desorber. In this manner additional efficiency can be achieved. Particularly where a stove, oven, or other heating source is required for one or various purposes within the structure in which the absorption cycle system is to be used, the use of the second heat exchanger for preheating the desorbent can be advantageous.

The absorption cycle system can be constructed as a single system housed in a single unit, or can be compartmentalized as is appropriate for the space or building to be cooled and/or dehumidified, for example, but not limited to, the absorber can be installed in a fresh air duct, which can be advantageous in a large facility such as a hospital, gym, or pool. A system, if desired, can include at least one desorber, at least one absorber, at least one heat exchanger, at least one condenser, and, optionally, at least one evaporator, and at least one pump, while employing a common process water source and a common hot water outlet. A method of water heating, dehumidifying, and/or evaporative cooling, according to an embodiment of the invention, can employ one or more absorption cycle systems that employ a common process water source or a plurality of different process water sources and can deliver heated water to a common hot water reservoir or a plurality of different hot water reservoirs.

All patent applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An absorption cycle system, comprising:
   at least one desorber;
   at least one absorber;
   at least one heat exchanger, wherein a conduit between the at least one desorber and the at least one absorber comprises the at least one heat exchanger; and
   at least one condenser,
   wherein:
     the at least one absorber interfaces with ambient air and absorbs water vapor, whereby the absorption cycle system has the capacity for dehumidification of air in contact with the at least one absorber;
     a process water source is plumbed to provide process water as a cooling medium; and
     the process water flows consecutively from an inlet at a first temperature through:
       the at least one absorber;
       the at least one heat exchanger; and
       the at least one condenser, wherein the process water discharged from the absorption cycle system has been heated to a second temperature higher than the first temperature.

2. The absorption cycle system of claim 1, wherein an absorbent in the at least one absorber is a concentrated aqueous solution of a non-volatile hygroscopic solute and a desorbent in the at least one desorber is a dilute aqueous solution of the non-volatile hygroscopic solute.

3. The absorption cycle system of claim 2, wherein the solute is LiBr.

4. The absorption cycle system of claim 1, wherein the at least one desorber is an ultra-thin film desorber.

5. The absorption cycle system of claim 1, wherein the at least one absorber is an ultra-thin film absorber.

6. The absorption cycle system of claim 1, wherein the at least one desorber, the at least one absorber, the at least one heat exchanger, and the at least one condenser are housed as a single unit.

7. The absorption cycle system of claim 1, wherein the at least one desorber, the at least one absorber, the at least one heat exchanger, and the at least one condenser are housed as a plurality of units.

8. The absorption system of claim 1, further comprising a second heat exchanger, wherein a desorbent entering the at least one desorber is preheated by a gas in the second heat exchanger.

9. The absorption system of claim 8, wherein the gas is a combustion product from a gas burner or an oil heater or from a boiled water from a heat source for the at least one desorber.

10. A method of water heating, comprising:
in-putting process water at a first temperature through an inlet to an absorption cycle system, wherein the absorption cycle system is according to claim 1 and further comprises at least one evaporator wherein the absorption cycle system has the capacity for evaporative cooling of air in contact with the at least one evaporator;
heating the process water sequentially within the at least one absorber, the at least one heat exchanger, and the at least one condenser; and
out-putting the process water from the absorption cycle system at a second temperature that is greater than the first temperature.

11. The method of water heating according to claim 10, with the at least one evaporator, wherein a controlled portion of the water vapor from the at least one evaporator is provided to the at least one absorber, whereby the air in a space in communication with the at least one absorber is dehumidified and the air in a space in communication with the at least one evaporator is cooled.

12. A method of dehumidifying, comprising:
in-putting process water at a first temperature through an inlet to the absorption cycle system according to claim 1, wherein the water vapor is provided to the at least one absorber from the ambient air without any second source of the water vapor, whereby the air in a space in communication with the at least one absorber is dehumidified.

13. The method of dehumidifying according to claim 12, wherein the at least one absorber is an ultra-thin film absorber.

14. The absorption cycle system of claim 1, further comprising at least one evaporator wherein the absorption cycle system has the capacity for evaporative cooling of air in contact with the at least one evaporator.

* * * * *